United States Patent [19]

Scott

[11] 3,981,586

[45] Sept. 21, 1976

[54] CONTINUOUSLY MONITORING RATIOMETER

[75] Inventor: Larkin B. Scott, Forth Worth, Tex.

[73] Assignee: The Perkin-Elmer Corporation, Norwalk, Conn.

[22] Filed: May 19, 1975

[21] Appl. No.: 578,500

[52] U.S. Cl. .............................. 356/97; 324/140 D; 328/161; 356/93
[51] Int. Cl.² .......................................... G01J 3/42
[58] Field of Search .................... 324/140 R, 140 D; 356/88, 93, 94, 95, 96, 97, 179, 195, 204, 205, 206, 211, 212; 328/161

[56] References Cited
UNITED STATES PATENTS

| | | | |
|---|---|---|---|
| 3,467,865 | 9/1969 | Scott et al. | 324/140 R |
| 3,875,519 | 4/1975 | Warren | 324/140 D |

Primary Examiner—John K. Corbin
Assistant Examiner—F. L. Evans
Attorney, Agent, or Firm—S. A. Giarratana; F. L. Masselle; J. M. O'Meara

[57] ABSTRACT

An analytically significant ratio between timevarying magnitudes of signals is periodically monitored in recurring cycles which are each synchronized with a frequency generator. During every monitoring cycle, each signal relating to the numerator and denominator of the ratio, is integrated separately for a fixed number of generator cycles. Thereafter in each monitoring cycle, the output from the integrator of the denominator signal is applied at the input to the integrator of the numerator signal and the time taken by the latter to integrate back to its starting level is measured in proportion to the ratio of the signals. Either digital or analog time measurements may be utilized and the number of generator cycles over which the ratio is determined may include transition periods between each stage of integration.

10 Claims, 3 Drawing Figures

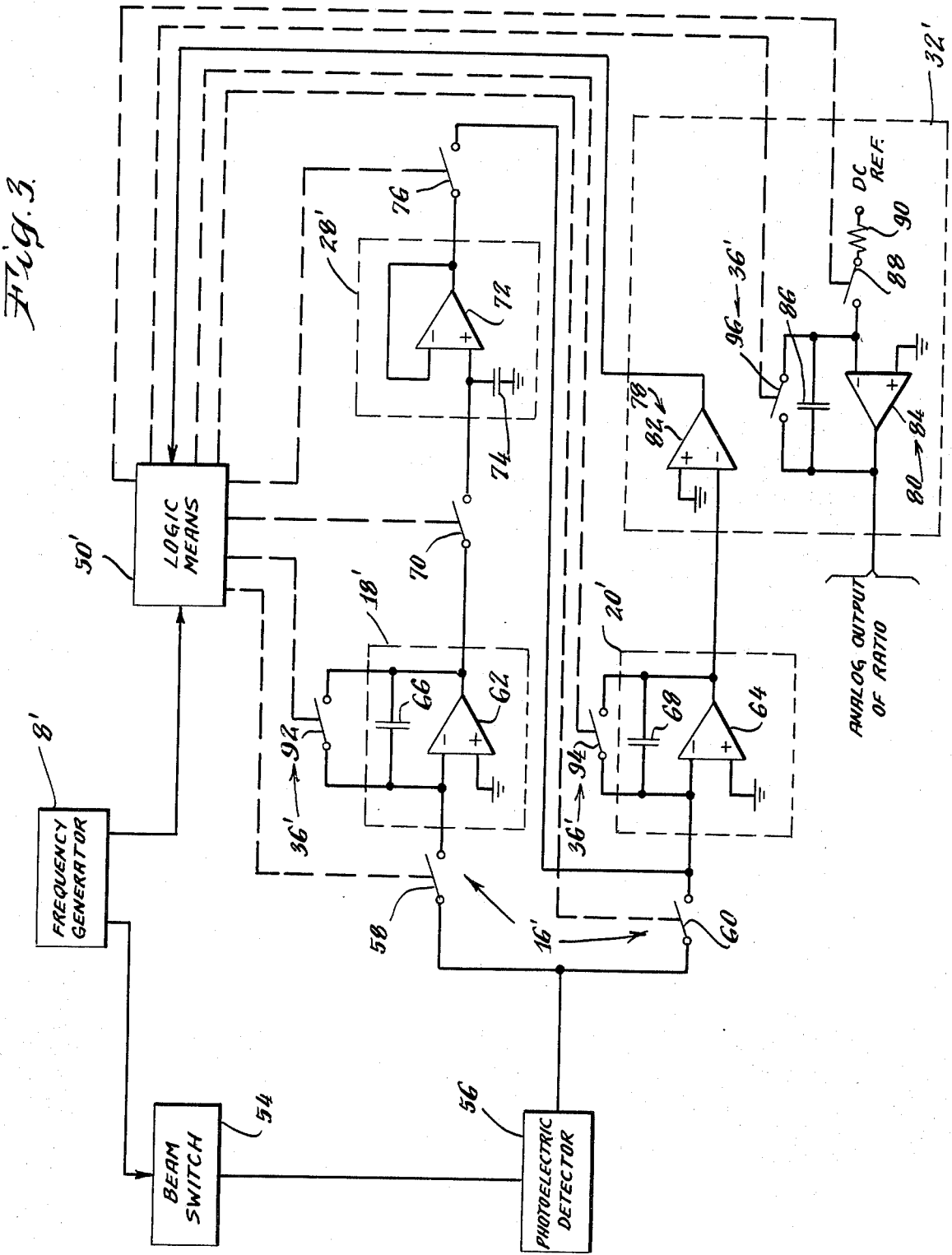

CONTINUOUSLY MONITORING RATIOMETER

BACKGROUND OF THE INVENTION

The present invention relates to apparatus which is synchronized with a frequency generator and periodically derives an updated ratio between time-varying signals being generated by an analytical instrument. Signal ratiometers are commonly known in the art of instrumentation, but few of these monitor the ratio continuously for applications where signal levels vary with time. In those continuously monitoring ratiometers which are known to the art, the ratio determined is between one time-varying signal and one fixed level signal, so that these ratiometers are useless in applications where both the numerator and denominator of the ratio relate to time-varying signals. Furthermore, error in the ratios derived with most known continuously monitoring ratiometers is caused by noise pickup from the power line energizing the instrument which generates the time-varying signal.

SUMMARY OF THE INVENTION

It is the object of this invention to provide apparatus for periodically monitoring the ratio between two signals of time-varying magnitudes.

It is another object of this invention to provide apparatus for periodically monitoring the ratio between signals of time-varying magnitudes in synchronism with the frequency of line power to the instrument generating these signals.

These objects are accomplished according to one embodiment of the present invention by establishing a monitoring cycle over some integral number of cycles from a frequency generator through a logic means. An initial integrating stage, a final integrating stage, and a resetting stage are included in each monitoring cycle and the events of each stage are programmed into intervals which are synchronized with the cycles of the frequency generator by the logic means. During the initial integrating stage, each time-varying signal of the ratio is directed by a chopper means to a separate integrator for at least one full generator cycle. Throughout the final integrating stage, a timer means measures the ratio in proportion to the interval elapsing while the output from the integrator of the numerator signal is driven back to its initial level after the output from the integrator of the denominator signal has been applied to the input thereof. Then in the resetting stage, both of the integrators and the timer means are returned to their initial conditions for the start of the next monitoring cycle. Each type of analytical instrument into which the ratiometer of this invention is incorporated will result in a different embodiment thereof. However, the timer means can be either digital or analog in these embodiments, while the stages of each monitoring cycle can occur either sequentially or concurrently therein.

BRIEF DESCRIPTION OF THE DRAWINGS

The manner in which these and other objects of the present invention are achieved will be best understood by reference to the following description, the appended claims, and the attached drawings wherein:

FIG. 3 is a combined schematic and block diagram for one embodiment of this invention which performs the monitoring cycle illustrated in FIG. 2.

DESCRIPTION OF THE PREFERRED EMBODIMENTS

Figure 1:
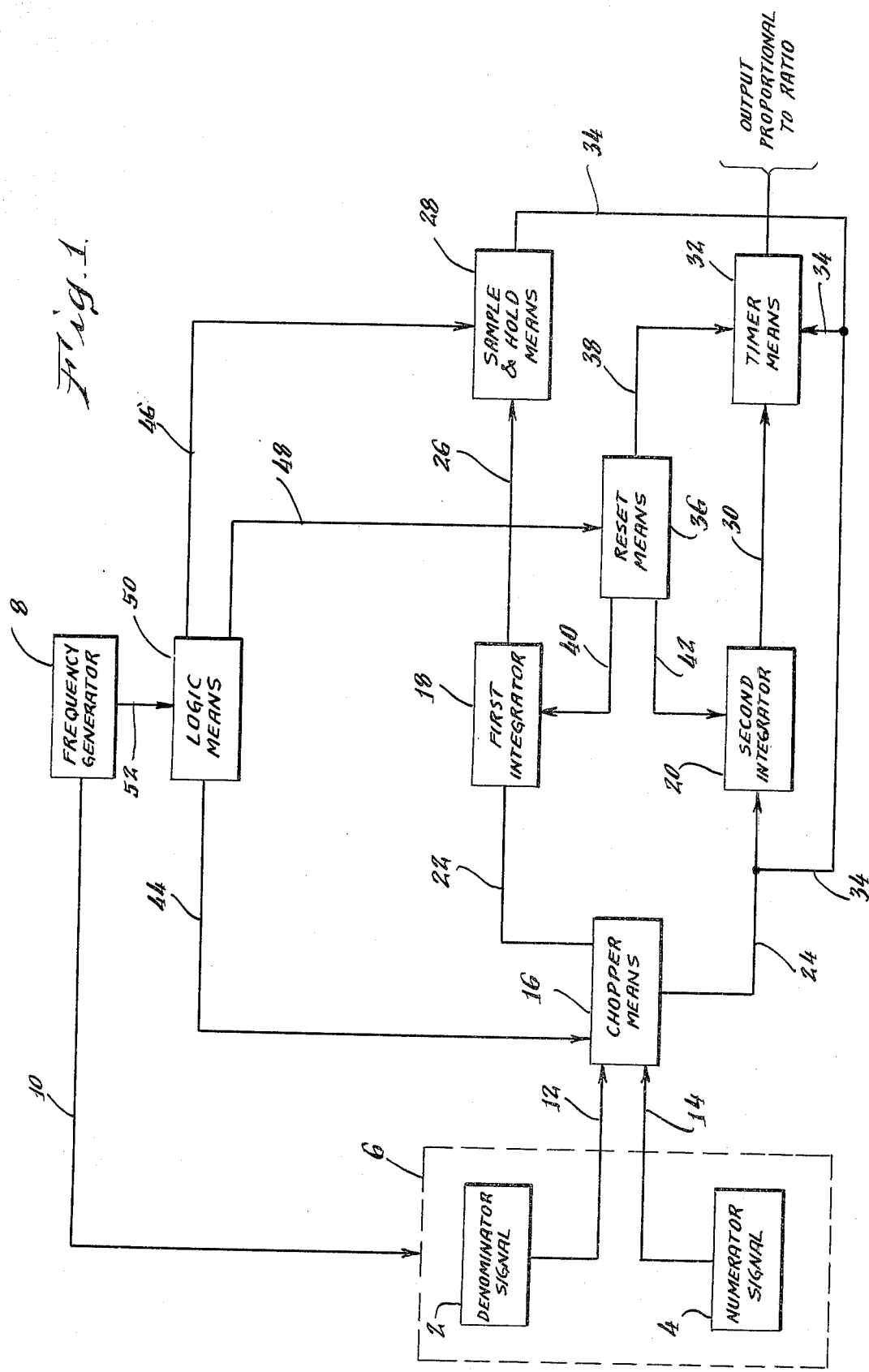
FIG. 1 is a block diagram for the signal ratio monitoring apparatus of this invention.

Turning now to the drawings, and more particularly to FIG. 1 there is illustrated a block diagram for the ratiometer of this invention. As is common in the art of analytical instruments, a denominator signal 2 of time-varying magnitude and a numerator signal 4 of time-varying magnitude are generated by an instrument 6 which is powered from a frequency-generator 8 through interconnection 10. The signals 2 and 4 are directed through interconnections 12 and 14 respectively to a chopper means 16 for applying each such signal separately to the input of a first integrator 18 and a second integrator 20 respectively, through interconnections 22 and 24 respectively. Output from the first integrator 18 is directed through interconnection 26 to the input of a sample and hold means 28 for storing such output, while output from the second integrator 20 is directed through interconnection 30 to the stop input of a timer means 32 for measuring elapsed intervals. Output from the sample and hold means 28 is directed to both the input of the second integrator 20 and the start input of the timer means 32, through interconnection 34. Reset means 36 for returning the timer means 32 and each of the integrators 18 and 20 to reference levels is directed through interconnections 38, 40, and 42 respectively. Interconnections 44, 46, and 48 are disposed between the chopper means 16, the sample and hold means 28, and the reset means 36 respectively and a logic means 50 for controlling each such means in synchronized intervals with the cycles of the frequency generator 8. An interconnection 52 is disposed between the logic means 50 and the frequency generator 8.

Although not shown in FIG. 1, the logic means 50 includes a combination of at least 3 gates and each of these gates operates to control a particular stage in a periodically repeated monitoring cycle. During the first stage of each monitoring cycle, the numerator and denominator signals 2 and 4 are each integrated over some fixed interval of at least one cycle of the frequency generator 8 and the integrated value of the denominator signal 2 is stored by the sample and hold means 28. Throughout this first stage, one gate in the logic means 50 controls the chopper means 16 in separately applying the signals 2 and 4 to the first and second integrators 18 and 20 respectively. During the second stage of each monitoring cycle, the interval elapsing while the output level of integrator 20 is integrated back to its value at the start of the monitoring cycle by the output level of integrator 18, is measured. Throughout this second stage another gate in the logic means 50 controls the sample and hold means 28 to apply the output level which is stored therein from integrator 18 simultaneously to both the input of integrator 20 and the start input of the timer means 32. During the third stage of each monitoring cycle, still another gate in the logic means 50 controls the reset means 36 in returning the timer means 32 and both integrators 18 and 20 to their starting conditions for the next monitoring cycle. Each gate in the logic means 50 is synchronized with the frequency generator 8 so that the interval of each stage in every monitoring cycle is equal to an integral multiple of frequency cycles therefrom.

Since the integration interval is fixed for each signal during the first stage of each monitoring cycle, the elapsed interval measured during the second stage varies in direct proportion to the ratio of the numerator signal 4 over the denominator signal 2. Of course, this ratio is determined anew during every monitoring cycle, and therefore, the ratiometer of FIG. 1 operates to continuously monitor the ratio existing between two time-varying signals. Furthermore, by fixing the integration interval of each time-varying signal to an integral multiple of cycles from the frequency generator 8, noise in either signal 2 or 4 at the frequency of the generator 8 or any harmonic thereof, will integrate out to zero and the accuracy of the ratiometer will be unaffected thereby.

In FIG. 1, the instrument 6 generating the signals 2 and 4 is only powered from the frequency generator 8 as a matter of convenience. Furthermore, the generator 8 may produce any predetermined frequency, including that of line power. Otherwise, the integrators 18 and 20 may be of any type however, an output inverted type is assumed to be utilized and a means for inverting the output from integrator 18 would be included where integrators of the output noninverted type are utilized. Also, the chopper means 16 and the reset means 36 include switches which will be incorporated as part of the logic means 50 in most ratiometer applications.

Of course, the duration of each monitoring cycle can be varied to suit any particular application. Furthermore, by expanding the logic means 50 to include more than the three gates discussed above, many ratiometer embodiments are possible within the scope of this invention. Although the elapsed interval measurement of the second stage in each monitoring cycle should be continuous in any embodiment of this invention, the first and third stages could occur in staggered intervals over each monitoring cycle. Such staggered intervals would be made possibly by adding a gate in the logic means 50 to control when the output of integrator 18 is stored by the sample and hold means 28, during the first stage. Then integrator 18 could be reset before integrator 20, and the first and third stages would occur concurrently rather than alternately during each monitoring cycle. Therefore, those skilled in the art of analytical instruments will realize without further explanation that the ratiometer of this invention could be incorporated in any instrument which generates time-varying signals.

One particularly appropriate application for the ratiometer of this invention is found in a spectrophotometer which is an instrument used for determining the concentrations of various constituents in sample substances. In a spectrophotometer, two radiation beams of substantially equal intensity are sequentially directed to a photoelectric detector by a beam switch or chopper. One of the beams serves as a reference of the intensity, while the other beam is passed through the sample which decreases the intensity thereof in proportion to constituent concentration therein. The photoelectric detector produces signals in proportion to the intensity of each beam and the ratio of these signals is then determined as part of the spectrophotometer analysis. It is common in the art of spectrophotometers to continuously monitor this ratio, because the signals relating thereto tend to vary with time. In the art of spectrophotometers it is also common for the beam switch to include an opaque or dark period when no radiation is directed to the photoelectric detector.

Figure 2:
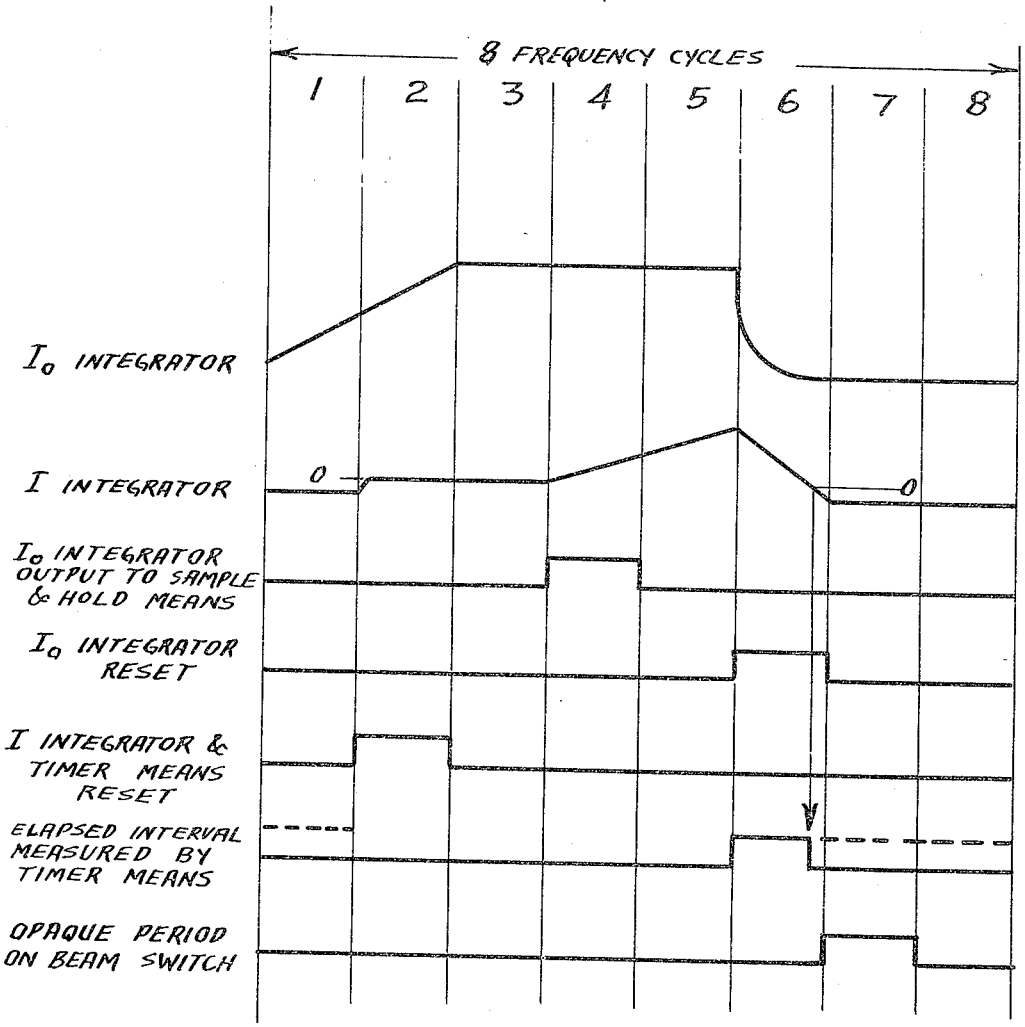
FIG. 2 is a timing diagram which illustrates one monitoring cycle of this invention within a spectrophotometer.

FIG. 2 illustrates the timing diagram of each monitoring cycle for the ratiometer of this invention in a particular spectrophotometer application. Of course, the ratio of the sample beam intensity (I) over the reference beam intensity ($I_0$) is determined in this application. The duration of this monitoring cycle is equal to eight cycles of the frequency generator and the three fundamental stages which were discussed previously regarding FIG. 1 are present therein. The first stage is staggered over the monitoring cycle in that the $I_0$ signal is integrated during frequency cycles 1 and 2, while the I signal is integrated during frequency cycles 4 and 5. Although FIG. 2 shows the output from the I signal integrator being "integrated back" to its starting level by the output level of the $I_0$ signal integrator within frequency cycle 6, the second stage can occur for a variable duration throughout frequency cycles 6, 7, 8, and 1, as is indicated by the dotted line. Of course, the interval elapsing while the output of the I integrator returns to its starting level is measured by the timer means during the second stage. The third stage is also staggered over the monitoring cycle in that the $I_0$ signal integrator is reset during frequency cycle 6, while the I signal integrator and the timer means are reset during frequency cycle 2. In this embodiment, the output level of the $I_0$ integrator is not only stored in the sample and hold means throughout the second stage, but is transferred thereto during frequency cycle 4 so that the first and third stages can be staggered. Furthermore, an opaque period exists on the beam switch within the spectrophotometer and is programmed as a transition period on the timing diagram of FIG. 2, even though it is unnecessary to any stage of the monitoring cycle.

Of course, many circuit arrangements could be devised to perform the three stages of the monitoring cycle in the timing diagram of FIG. 2. One particularly appropriate circuit for this purpose is illustrated in FIG. 3 where the block elements of FIG. 1 are identified by their same numerals but with a prime (') added. Because the timing diagram of FIG. 2 relates to a spectrophotometer, a beam switch 54 alternately directs a reference beam and a sample beam to a photoelectric detector 56, in FIG. 3. Consequently, the photoelectric detector 56 alternately produces I and $I_0$ signals and the beam switch 54 must be synchronized with the gates of the logic means 50' so that these signals can be integrated separately over staggered intervals during the first stage of the monitoring cycle. Such synchronization is attained in this spectrophotometer application by driving the beam switch 54 with a synchronous motor (not shown) from the same frequency generator 8' as that to which the gates of the logic means 50' are synchronized. Of course, this synchronization could be attained in other ways, such as by establishing the frequency of the generator 8' directly from the beam switch 54 which is then driven from line power or some other power supply.

Otherwise, in FIG. 3, switches 58 and 60 are disposed in the logic means 50', to serve as the chopper means 16'. These switches 58 and 60 connect the output from the photoelectric detector 56 to the first and second integrators 18' and 20' respectively, and separately direct the $I_0$ and I signals respectively therebetween. Each of the integrators 18' and 20' include an operational amplifier 62 and 64 respectively, with each noninverting input thereof grounded and with each inverting input thereof connected to a feedback capacitor 66 and 68 respectively. Output from integrator 18' is connected through a switch 70 in the logic means 50' to the sample and hold means 28' which includes an operational amplifier 72 having the noninverting input thereof connected to both the output from integrator 18' and to ground through a capacitor 74. Otherwise, amplifier 72 has its output shunt connected to the inverting input thereof. Output from the sample and hold means 28' is connected through a switch 76 in the logic means 50' to the input of the integrator 20' from which the output is connected to start and stop the timer means 32' which includes a comparitor 78 and a ramp generator 80. The comparitor 78 includes an operational amplifier 82 having the inverting input thereof connected to the output from integrator 20' and having the noninverting input thereof grounded. The ramp generator 80 includes an operational amplifier 84 having the inverting input thereof connected to a feedback capacitor 86 and having the noninverting input thereof grounded. A switch 88 is disposed in the logic means 50' and connects a d.c. reference voltage through a resistor 90 to the inverting input of amplifier 84. Switches 92, 94, and 96 are disposed in the logic means 50' and are connected to shunt the capacitors 66, 68 and 86 respectively, as the reset means 36'. Of course, the switches 58, 60, 70, 76, 88, 92, 94 and 96 are all controlled by gates within the logic means 50' and these switches could be of any type, such as solid state FET switches. Furthermore, all of these gates are driven synchronously with the frequency generator 8 except that the gate controlling switch 88 is driven by the output from the comparator 78.

Those skilled in the electrical arts will readily understand that each of the operational amplifiers 62, 64, 72, 82, and 84 is arranged to function conventionally. Amplifiers 62, 64 and 84 each function as an integrator because their inverting input is driven to the ground level which is applied to their noninverting input by the current being feed back from their output through capacitors 66, 68 and 86 respectively. Of course, a time constant is inherent to each of these integrators, however, only the resistor 90 and capacitor 86 combination of the time constant for amplifier 84 is shown in FIG. 3. Otherwise, each of these integrators is reset to initial conditions when their feedback capacitor has been discharged by closing switches 92, 94 and 96 respectively. Amplifier 72 functions to hold its output at whatever level is applied to its noninverting input by capacitor 74 because the inverting input thereof is shunted to that output. Furthermore, the output impedance of amplifier 72 is low while the noninverting input impedance thereof is high and therefore, the output level thereof can be applied over a period of time without substantially discharging the capacitor 74. Amplifier 82 functions to produce an output equal to the differential existing between levels of similar polarity on its inverting input and noninverting input. Therefore, the output of amplifier 82 changes polarity when its inverting input transgresses through ground level because of its noninverting input being grounded.

Of course, the comparitor 78 and the ramp generator 80 are only included in the timer means 32' to derive an analog output of the $I/I_0$ ratio and a digital arrangement of the timer means 32' could certainly be utilized in other applications. Otherwise, the ratiometer embodiment of FIG. 3 periodically performs a monitoring cycle of three stages in the same general manner as was explained previously for the block diagram of FIG. 1. The first stage starts when switch 58 closes during frequency cycles 1 and 2 to integrate the $I_0$ signal with integrator 18' from which the output is inverted due to the use of operational amplifier 62 therein. Then, switch 70 closes during frequency cycle 4 to store the integrated $I_0$ signal in the sample and hold means 28', while switch 68 closes during frequency cycles 4 and 5 to integrate the I signal with integrator 20'. The second stage starts when switches 76 and 88 close simultaneously at the start of frequency cycle 6 to direct the integrated $I_0$ signal into integrator 20' and to apply the d.c. reference voltage through resistor 90 to the inverting input of amplifier 84. Switch 76 remains closed throughout frequency cycles 6, 7, 8 and 1 but because the gate of the logic means 50' which controls switch 88 is synchronized with the output of the comparitor 78, switch 88 remains closed only until the output from integrator 20' transgresses through the ground level at which the output of the comparitor 78 changes polarity. Therefore, amplifier 84 integrates the d.c. reference voltage for as long as switch 88 is closed to thereby generates an output of constant slope from the ramp generator 80. Of course, the level of output from the ramp generator 80 at any time is proportional to the interval over which switch 88 has been closed. Consequently, the level reached by the output from the ramp generator 80 during the second stage is directed proportional to the ratio of $I/I_0$. Furthermore, those skilled in the art will realize without further explanation that the output from the ramp generator 80 can be stored in a sample and hold means similar to that described previously. The third stage starts when switch 92 closes during frequency cycle 6 to reset integrator 18' and it is completed when switches 94 and 96 close during frequency cycle 2 to reset both the integrators 20' and the ramp generator 80.

What I claim is:

1. Apparatus for continuously monitoring a ratio between two time-varying signals, comprising:
   a first integrator for the signal relating to the denominator of the ratio;
   a second integrator for the signal relating to the numerator of the ratio;
   chopper means for applying each of the signals to said corresponding integrator;
   sample and hold means for storing the output of said first integrator; said sample and hold means having the output thereof connected to the input of said second integrator;
   timer means for measuring the elapsed interval between when output from said sample and hold means is applied to said second integrator and when output from said second integrator transgresses through a reference level;
   reset means for returning said timer means and each said integrator to reference levels;
   a frequency generator; and
   logic means for controlling said chopper means, the output from said sample and hold means, and said reset means in synchronized intervals with the cycles of said frequency generator, said chopper means being controlled to apply the signals to said integrators for at least one frequency cycle, the output from said sample and hold means being controlled for connecting to said second integrator only after integration of the numerator signal has been completed thereby, and said reset means being controlled to establish the reference levels only after the elapsed interval in proportion to the ratio of the signals has been measured by said timer means.

2. The apparatus of claim 1 wherein said frequency generator is an a.c. power line.

3. The apparatus of claim 1 wherein said chopper means and said reset means both include field effect transistor switches within said logic means.

4. The apparatus of claim 1 wherein said sample and hold means includes an operational amplifier having the output thereof shunted to the inverting input thereof and having the noninverting input thereof grounded through a capacitor.

5. The apparatus of claim 1 wherein said first and second integrators each include an operational amplifier having a capacitor connected between the output and the inverting input thereof and having the noninverting input thereof grounded.

6. The apparatus of claim 1 wherein said timer means includes a level detecting comparator, a ramp generator and a d.c. voltage reference, said comparator having the input thereof connected to the output from said second integrator and the output thereof connected to control a gate within said logic means to apply said reference voltage at the input of said ramp generator throughout the elapsed interval measurement.

7. The apparatus of claim 1 wherein said chopper means applies the signals to said integrators during alternate intervals and wherein a gate in said logic means controls input to said sample and hold means, the output from said first integrator being stored in said sample and hold means prior to completion of the interval for said second integrator.

8. The apparatus of claim 1 wherein said chopper means receives the signals from a photoelectric detector within a spectrophotometer having a beam switch therein, said beam switch being synchronized with said frequency generator to alternately direct beams of radiant energy to said photoelectric detector from both sample and reference paths said photoelectric detector generating output signals I and $I_0$ in proportion to the intensity of said sample and reference beams respectively, said $I_0$ and I signals being applied to said first and second integrators respectively by said chopper means with the elapsed interval measured by said timer means being proportional to the ratio of $I/I_0$.

9. The apparatus of claim 8 wherein said beam switch includes a synchronous motor and applies each of the sample and reference beams to said photoelectric detector for a duration of two frequency cycles.

10. In a spectrophotometer having a beam switch which alternately directs beams of radiant energy to a photoelectric detector from sample and reference paths therein, said photoelectric detector generating output signals I and $I_0$ in proportion to the intensity of the sample and reference beams respectively, the improvement comprising:

a first integrator including a first operational amplifier with a capacitor connected between the output and the inverting input thereof and with the noninverting input thereof grounded;

a second integrator including a second operational amplifier with a capacitor connected between the output and the inverting input thereof and with the noninverting input thereof grounded;

sample and hold means including a third operational amplifier with the output thereof shunted to the inverting input thereof and with the noninverting input thereof grounded through a capacitor;

a comparator including a fourth operational amplifier with the inverting input thereof connected to the output of said second operational amplifier and with the noninverting input thereof grounded;

a ramp generator including a fifth operational amplifier with a capacitor connected between the output and the inverting input thereof and with the noninverting input thereof grounded; and logic means for synchronizing individual switches with a.c. power to the spectrophotometer, and with output from said comparator; said first operational amplifier having the inverting input thereof connected to the output from said photoelectric detector through a first of said switches; said second operational amplifier having the inverting input thereof connected to the output from said photoelectric detector through a second of said switches; said third operational amplifier having the noninverting input thereof connected to the output of said first operational amplifier through a third of said switches and having the output therefrom connected to the inverting input of said second operational amplifier through a fourth of said switches; said fifth operational amplifier having the inverting input thereof connected to a d.c. reference voltage through a fifth of said switches; said first, second and fifth operational amplifiers each having the output thereof shunted to the inverting input thereof through a sixth, seventh and eighth of said switches respectively; said logic means programming said switches to periodically derive the ratio of $I/I_0$ over identical monitoring periods of eight power cycles; said first switch being programmed to close for the first and second power cycles; said second switch being programmed to close for the fourth and fifth power cycles; said third switch being programmed to close for the fourth power cycle; said fourth switch being programmed to close for the sixth, seventh, eighth and first power cycles; said fifth switch being programmed to close during the sixth, seventh, eighth and first power cycles for as long as output from said second operational amplifier exceeds the comparator threshold level on the noninverting input of said fourth operational amplifier; said sixth switch being programmed to close for the sixth power cycle; and said seventh and eighth switches being programmed to close for the second power cycle.

* * * * *